(12) United States Patent
Klustaitis et al.

(10) Patent No.: US 9,038,179 B2
(45) Date of Patent: May 19, 2015

(54) SECURE CODE VERIFICATION ENFORCEMENT IN A TRUSTED COMPUTING DEVICE

(75) Inventors: Paul Klustaitis, Durham, NC (US); Nathan C. Skalsky, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 253 days.

(21) Appl. No.: 13/596,369

(22) Filed: Aug. 28, 2012

(65) Prior Publication Data

US 2014/0068766 A1 Mar. 6, 2014

(51) Int. Cl.
*G06F 21/00* (2013.01)
*G06F 21/57* (2013.01)
*G06F 21/55* (2013.01)
*G06F 21/81* (2013.01)
*G06F 21/50* (2013.01)
*G06F 21/86* (2013.01)
*G06F 21/56* (2013.01)

(52) U.S. Cl.
CPC .............. *G06F 21/575* (2013.01); *G06F 21/86* (2013.01); *G06F 21/567* (2013.01); *G06F 21/554* (2013.01); *G06F 21/81* (2013.01); *G06F 21/57* (2013.01); *G06F 21/565* (2013.01); *G06F 21/50* (2013.01)

(58) Field of Classification Search
None
See application file for complete search history.

(56) References Cited

U.S. PATENT DOCUMENTS

| | | | |
|---|---|---|---|
| 5,887,131 A * | 3/1999 | Angelo | 726/20 |
| 7,770,000 B2 | 8/2010 | Schunter et al. | |
| 7,917,741 B2 | 3/2011 | Dutton et al. | |
| 7,921,303 B2 | 4/2011 | Mauro, II | |
| 8,433,923 B2 * | 4/2013 | Yasaki et al. | 713/187 |
| 8,595,491 B2 * | 11/2013 | Nice et al. | 713/168 |
| 2005/0039040 A1 * | 2/2005 | Ransom et al. | 713/200 |
| 2006/0130156 A1 * | 6/2006 | Ng et al. | 726/33 |
| 2007/0113277 A1 * | 5/2007 | Chiang | 726/18 |
| 2008/0222430 A1 * | 9/2008 | Buscaglia et al. | 713/194 |
| 2009/0055612 A1 * | 2/2009 | Sibert | 711/163 |
| 2009/0113220 A1 * | 4/2009 | Lee et al. | 713/193 |
| 2009/0327741 A1 | 12/2009 | Zimmer et al. | |
| 2010/0042824 A1 | 2/2010 | Lee et al. | |

(Continued)

OTHER PUBLICATIONS

Bertholon, et al., "CertiCloud: A Novel TPM-based Approach to Ensure Cloud IaaS Security", 2011 IEEE International Conference on Cloud Computing (CLOUD), Date of Conference: Jul. 4-9, 2011, pp. 121-130, Conference Location: Washington, DC, IEEE, USA. Digital Object Identifier : 10.1109/CLOUD.2011.71.

(Continued)

*Primary Examiner* — Andrew Nalven
*Assistant Examiner* — Christopher Ruprecht
(74) *Attorney, Agent, or Firm* — Edward J. Lenart; Katherine S. Brown; Kennedy Lenart Spraggins LLP

(57) ABSTRACT

Secure code verification enforcement in a trusted computing device, including: examining, by a secure code validation module, a trusted computing device that is locked in a powered down state in response to an impermissible physical access of the trusted computing device; determining, by the secure code validation module, whether content of trusted memory in the trusted computing device has been altered; and responsive to determining that the content of trusted memory in the trusted computing device has not been altered, unlocking, by the secure code validation module, the trusted computing device such that the trusted computing device can be powered up.

16 Claims, 4 Drawing Sheets

(56) References Cited

U.S. PATENT DOCUMENTS

| | | | |
|---|---|---|---|
| 2010/0235912 A1* | 9/2010 | Hermann et al. | 726/23 |
| 2011/0010543 A1 | 1/2011 | Schmidt et al. | |
| 2011/0055534 A1* | 3/2011 | Chung | 713/2 |
| 2011/0099361 A1* | 4/2011 | Shah et al. | 713/2 |
| 2011/0154010 A1* | 6/2011 | Springfield et al. | 713/100 |
| 2011/0302638 A1 | 12/2011 | Cha et al. | |
| 2012/0060039 A1 | 3/2012 | Leclercq | |
| 2012/0115441 A1* | 5/2012 | Schell | 455/411 |
| 2012/0159641 A1* | 6/2012 | Rossi et al. | 726/27 |
| 2012/0233449 A1* | 9/2012 | Thibadeau et al. | 713/2 |
| 2013/0081124 A1* | 3/2013 | de Cesare et al. | 726/7 |
| 2014/0025944 A1* | 1/2014 | Maletsky et al. | 713/150 |

OTHER PUBLICATIONS

Suh, et al., "Aegis: A Single-Chip Secure Processor", IEEE Design & Test of Computers: Design and Test of ICs for Secure Embedded Computing, Nov. 2007, pp. 570-580, vol. 24 Issue 6, IEEE Computer Society Press, Los Alamitos, CA, USA. Digital Object Identifier: 10.1109/MDT.2007.179.

Wikipedia, "Physical Security", http://wikipedia.org (online), URL: http://en.wikipedia.org/wiki/Physical_security, accessed Apr. 19, 2012, 4 pages.

Wikipedia, "Computer case", http://wikipedia.org (online), URL: http://en.wikipedia.org/wiki/Computer_case#Intrusion_detection, accessed Apr. 19, 2012, 4 pages.

* cited by examiner

SECURE CODE VERIFICATION ENFORCEMENT IN A TRUSTED COMPUTING DEVICE

BACKGROUND OF THE INVENTION

1. Field of the Invention

The field of the invention is data processing, or, more specifically, methods, apparatus, and products for secure code verification enforcement in a trusted computing device.

2. Description of Related Art

Consumer and enterprise computing systems can contain trusted platform modules and associated trusted firmware code stored in ROMs that are presumed to be trustworthy. This basis of trusted firmware is used as the secure foundation for many up-stack security technologies. While the contents of such ROMs are protected from access by user programs, they are not protected from physical attack. Physical attacks are often referred to as Supply Chain Attacks and can occur during the manufacturing process, delivery process, or even when maintenance operations are performed. During such attacks, a computing system may be compromised in such a way that is undetectable to traditional security applications such as anti-virus software.

SUMMARY OF THE INVENTION

Methods, apparatus, and products for secure code verification enforcement in a trusted computing device, including: examining, by a secure code validation module, a trusted computing device that is locked in a powered down state in response to an impermissible physical access of the trusted computing device; determining, by the secure code validation module, whether content of trusted memory in the trusted computing device has been altered; and responsive to determining that the content of trusted memory in the trusted computing device has not been altered, unlocking, by the secure code validation module, the trusted computing device such that the trusted computing device can be powered up.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
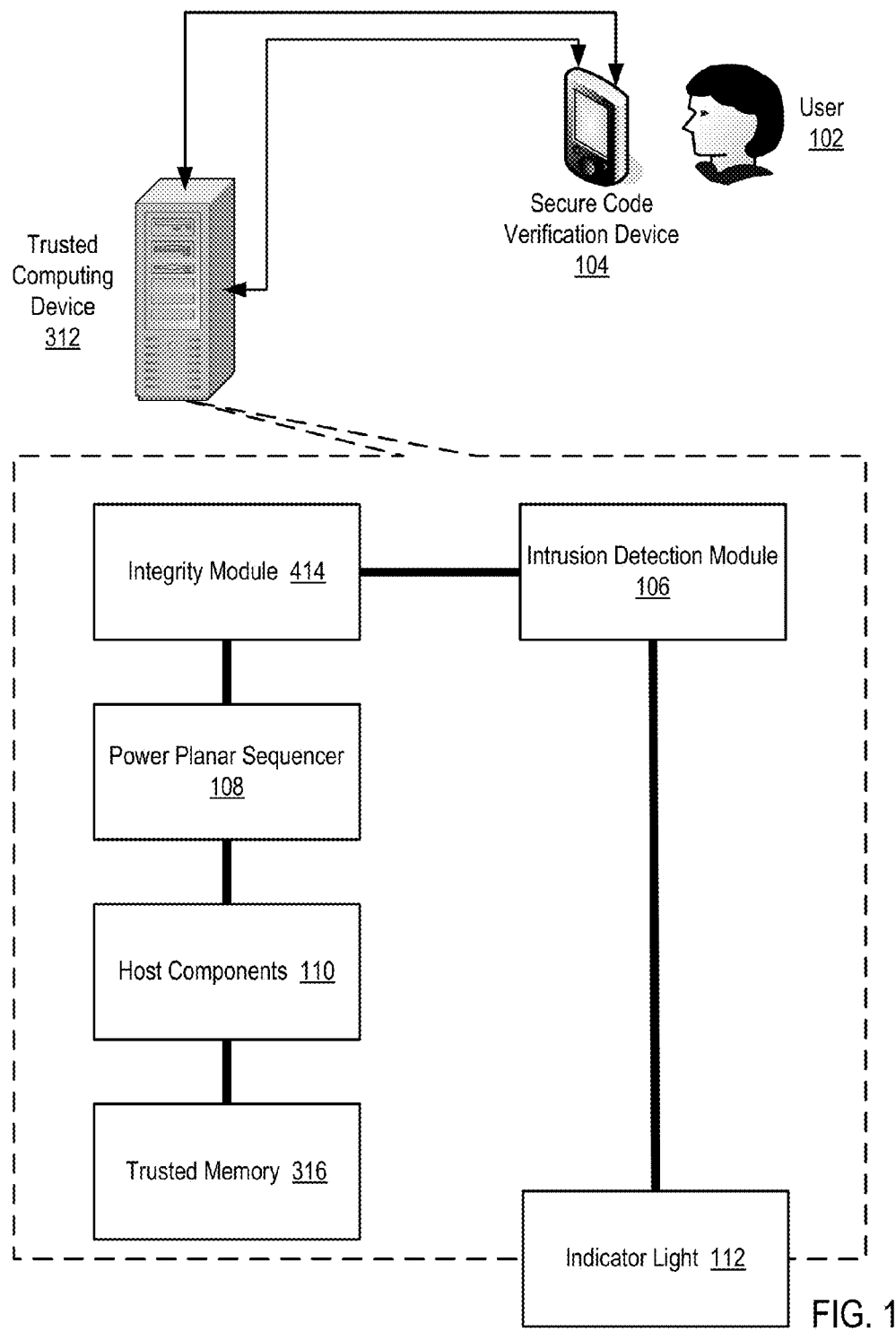
FIG. 1 sets forth a diagram of a system for secure code verification enforcement in a trusted computing device according to embodiments of the present invention.

Example methods, apparatus, and products for secure code verification enforcement in a trusted computing device in accordance with the present invention are described with reference to the accompanying drawings, beginning with FIG. 1. FIG. 1 sets forth a diagram of a system for secure code verification enforcement in a trusted computing device (312) according to embodiments of the present invention. The system of FIG. 1 includes a trusted computing device (312). The trusted computing device (312) of FIG. 1 may be embodied, for example, as a standalone computer, server, blade server, or other computing device.

The trusted computing device (312) of FIG. 1 includes one or more intrusion detection modules (106) configured to detect an impermissible physical access of the trusted computing device (312). In the example of FIG. 1, the one or more intrusion detection modules (106) may be embodied, for example, as a sensor that identifies when an enclosure for the trusted computing device (312) has been opened, as a near field communication ('NFC') device that can detect when the trusted computing device (312) has been taken far enough away from another NFC device in a predetermined secure area such that the trusted computing device (312) is no longer in the secure area, and so on.

The trusted computing device (312) of FIG. 1 also includes an integrity module (414) operatively coupled to the one or more intrusion detection modules (106). The integrity module (414) of FIG. 1 may be embodied, for example, as an application-specific integrated circuit ('ASIC'), complex programmable logic device ('CPLD'), or similar computer logic component. In the example of FIG. 1, the integrity module (414) is configured to lock, upon receiving an indication of an impermissible physical access of the trusted computing device (312) from the one or more intrusion detection modules (106), the trusted computing device (312) such that the trusted computing device (312) cannot be powered up. In such an example, locking the trusted computing device (312) such that the trusted computing device (312) cannot be powered up may be carried out, for example, by invalidating a power sequencer power certificate used by the power planar sequence (108) to power up the host components (110) of the trusted computing device (312). Such host components (110) may include, for example, computer processors, expansion cards, computer memory, and so on.

In the example of FIG. 1, the integrity module (414) is further configured to unlock, upon receiving an indication of secure code validity from a secure code verification device (104), the trusted computing device (312) such that the trusted computing device can be powered up. The secure code verification device (104) is described in greater detail below with reference to FIG. 2. In the example of FIG. 1, unlocking the trusted computing device (312) such that the trusted computing device (312) can be powered up may be carried out by acquiring a new power sequencer power certificate used by the power planar sequence (108) to power up the host components (110) of the trusted computing device (312). The integrity module (414) of FIG. 1 may include computer memory that contains a security key for use by a secure code verification device (104) as described in greater detail below with reference to FIGS. 2-4.

The trusted computing device (312) of FIG. 1 also includes an indicator light (112) operatively coupled to the one or more intrusion detection modules (106). The indicator light (112) of FIG. 1 illuminates upon receiving an indication of an impermissible physical access of the trusted computing device (312) from the one or more intrusion detection modules (106). In such an example, a user (102) such as a system administrator or quality assurance engineer can visibly inspect the indicator light to determine if the trusted computing device (312) has been subject to an impermissible physical access.

The trusted computing device (312) of FIG. 1 also includes trusted memory (316) that includes secure code. The trusted memory (316) in the trusted computing device (312) may be embodied, for example, as an option ROM that includes system Basic Input Output System ('BIOS') for the trusted computing device (312), an option ROM that includes firmware for one or more peripheral devices installed on the trusted computing device (312), and so on. In the example of FIG. 1, the trusted memory (316) may be embodied as an option ROM and the secure code may be embodied as firmware for use by the trusted computing device (312).

Figure 2:
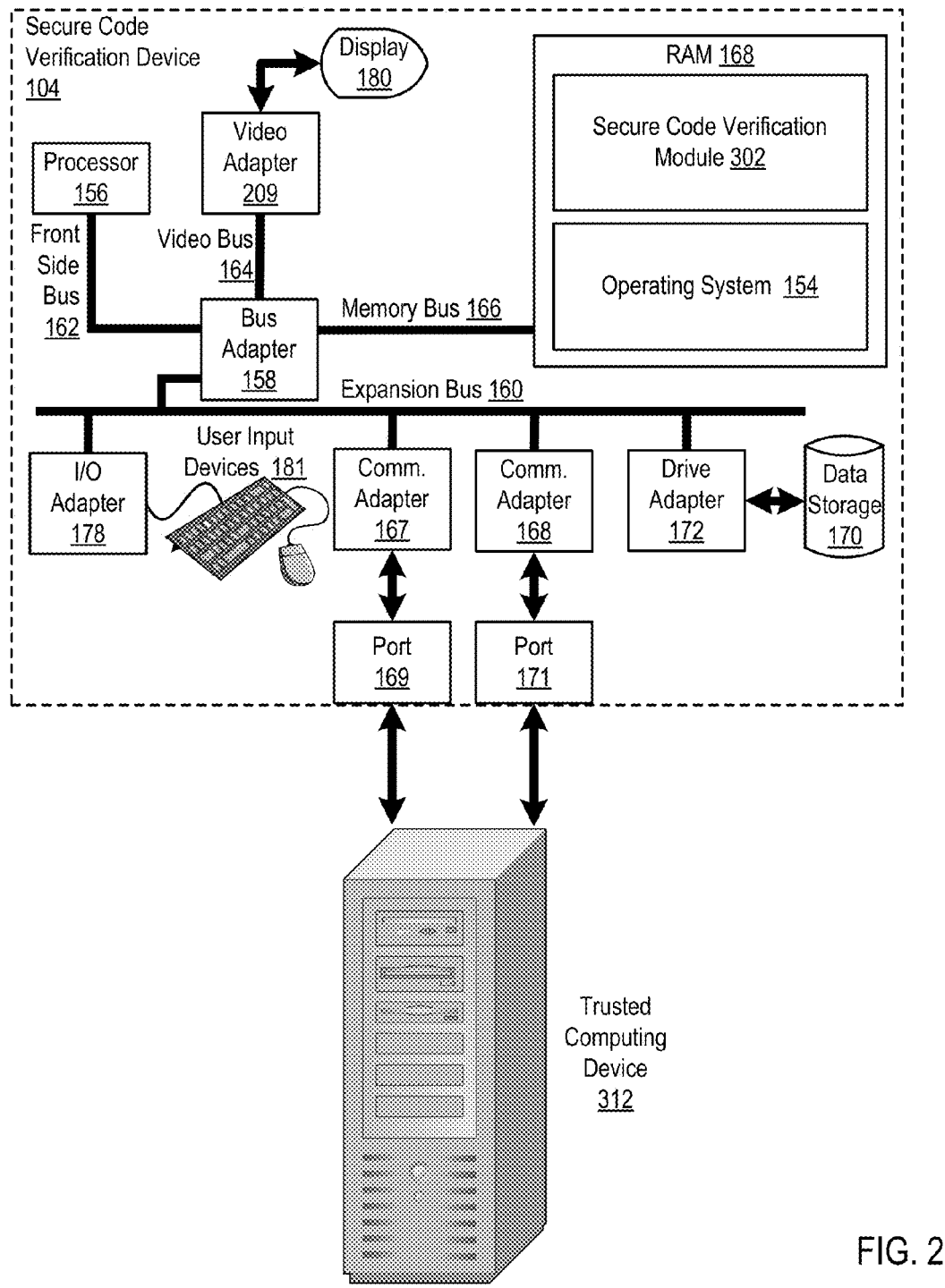
FIG. 2 sets forth a block diagram of automated computing machinery comprising an example secure code verification device useful in secure code verification enforcement in a trusted computing device according to embodiments of the present invention.

For further explanation, FIG. 2 sets forth a block diagram of automated computing machinery comprising an example secure code verification device (104) useful in secure code verification enforcement in a trusted computing device (312) according to embodiments of the present invention. The secure code verification device (104) of FIG. 2 includes at least one computer processor (156) or 'CPU' as well as random access memory (168) ('RAM') which is connected through a high speed memory bus (166) and bus adapter (158) to processor (156) and to other components of the secure code verification device (104).

Stored in RAM (168) is a secure code verification module (302), a module of computer program instructions for secure code verification enforcement in a trusted computing device (312). The secure code verification module (302) of FIG. 2 can carry out secure code verification enforcement in a trusted computing device (312) by examining a trusted computing device (312) that is locked in a powered down state in response to an impermissible physical access of the trusted computing device (312). An impermissible physical access of the trusted computing device (312) may include, for example, opening an enclosure for the trusted computing device (312), taking the trusted computing device (312) outside of a secure area, and so on. In response to determining that the trusted computing device (312) has been impermissibly accessed, the trusted computing device (312) can be locked in a powered down state such that the trusted computing device (312) cannot be powered on.

The secure code validation module (302) of FIG. 2 examines the trusted computing device (312) that is locked in a powered down state in response to an impermissible physical access of the trusted computing device (312). The secure code validation module (302) may be embodied, for example, as module of computer program instructions executed by computer hardware such as a computer processor (156). The secure code validation module (302) examines the trusted computing device (312), for example, by inspecting various aspects of the trusted computing device (312) to determine that secure code within the trusted computing device (312) has not been altered, disabled, or otherwise compromised during the impermissible physical access of the trusted computing device (312).

The secure code verification module (302) of FIG. 2 can further carry out secure code verification enforcement in a trusted computing device (312) by determining whether content of trusted memory in the trusted computing device (312) has been altered. The trusted memory in the trusted computing device (312) may be embodied, for example, as an option ROM that includes system Basic Input Output System ('BIOS') for the trusted computing device (312), an option ROM that includes firmware for one or more peripheral devices installed on the trusted computing device (312), and so on. The secure code verification module (302) of FIG. 2 can determine whether content of trusted memory in the trusted computing device (312) has been altered by extracting, from an integrity module in the trusted computing device (312), a security key. The integrity module in the trusted computing device (312) may be embodied, for example, as an ASIC, CPLD, or similar computer logic component that includes computer memory for storing the security key. The security key represents a particular value that may be used to verify the validity of the content of trusted memory in the trusted computing device (312). For example, the security key may be set to the resultant value of performing a particular hash operation on the original content of trusted memory in the trusted computing device (312).

In the example of FIG. 2, the secure code validation module (302) may extract the security key from the integrity module in the trusted computing device (312) over an Inter-Integrated Circuit ('I2C') encrypted communications cable coupling the integrity module in the trusted computing device (312) to the secure code validation module (302). I2C is a multi-master serial computer bus invented by primarily used to attach low-speed peripherals to a motherboard, embedded system, cellphone, or other electronic device. In the example method of FIG. 4, the I2C encrypted communications cable includes data communications lines for implementing the I2C bus architecture. In such an example, one end of the I2C encrypted communications cable may be coupled to a port on the trusted computing device (312) that is operatively coupled to the integrity module and the other end of the I2C encrypted communications cable may be coupled to a port (169, 171) on a secure code verification device (104) that is operatively coupled to the secure code verification module (312).

The secure code verification module (302) of FIG. 2 can further determine whether content of trusted memory in the trusted computing device (312) has been altered by generating a memory module content value in dependence upon the contents of trusted memory in the trusted computing device (312). The memory module content value is a value that represents the content of trusted memory in the trusted computing device (312). Generating a memory module content value in dependence upon the contents of trusted memory in the trusted computing device (312) may be carried out, for example, by applying a hash function to the contents of the trusted memory in the trusted computing device (312). Such a hash function may take the contents of the trusted memory in the trusted computing device (312) as input and generate a value output. Such a value can serve as a unique identifier of the contents of the trusted memory in the trusted computing device (312) as applying the same hash value to different input would result in a different output value.

The secure code verification module (302) of FIG. 2 can further determine whether content of trusted memory in the trusted computing device has been altered by determining, by the secure code verification module, whether the memory module content value matches the security key. In the example of FIG. 2, applying the same hash function to the original content of the trusted memory and the current content of the trusted memory, and comparing the resultant values, can enable the secure code verification module (302) to verify that the contents of the trusted memory have not been altered, in spite of the impermissible physical access of the trusted computing device (312).

The secure code verification module (302) of FIG. 2 can further carry out secure code verification enforcement in a trusted computing device (312) by unlocking the trusted computing device (312) such that the trusted computing device (312) can be powered. In the example of FIG. 2, unlocking the trusted computing device (312) occurs in response to determining that the content of trusted memory in the trusted computing device (312) has not been altered. Because the content of trusted memory in the trusted computing device (312) has not been altered, the content of trusted memory in the trusted computing device (312) can be presumed to be uncompromised in spite of the fact that an impermissible physical access of the trusted computing device (312) occurred. As such, the trusted computing device (312) can be safely operated without concern that the trusted computing device (312) was compromised by the impermissible physical access of the trusted computing device (312). Unlocking the trusted computing device (312) such that the trusted computing device (312) can be powered up may be carried out, for example, by acquiring a new power sequencer power certificate. Upon detection of the impermissible intrusion, the trusted computing device (312) may invalidate the power sequencer power certificate such that a power sequencer cannot begin to power up the trusted computing device (312). In such an example, when unlocking the trusted computing device (312), a new power sequencer power certificate may be acquired such that power sequencing operations can begin and the trusted computing device (312) can be powered on.

Also stored in RAM (168) is an operating system (154). Operating systems useful secure code verification enforcement in a trusted computing device (312) according to embodiments of the present invention include UNIX™, Linux™, Microsoft XP™, AIX™, IBM's i5/OS™, and others as will occur to those of skill in the art. The operating system (154) and secure code verification module (302) in the example of FIG. 2 are shown in RAM (168), but many components of such software typically are stored in non-volatile memory also, such as, for example, on a disk drive (170).

The secure code verification device (104) of FIG. 2 includes disk drive adapter (172) coupled through expansion bus (160) and bus adapter (158) to processor (156) and other components of the secure code verification device (104). Disk drive adapter (172) connects non-volatile data storage to the secure code verification device (104) in the form of disk drive (170). Disk drive adapters useful in computers for secure code verification enforcement in a trusted computing device (312) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example secure code verification device (104) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example secure code verification device (104) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example secure code verification device (104) of FIG. 2 includes two communications adapter (167, 168) for data communications with other computers such as the trusted computing device (312). Such data communications may be carried out serially through RS-232 connections, through external buses such as a Universal Serial Bus ('USB'), through the use of cables such as an I2C cable, serial peripheral interface ('SPI') cable, and in other ways as will occur to those of skill in the art. Communications adapters implement the hardware level of data communications through which one computer sends data communications to another computer, directly or through a data communications network.

The secure code verification device (104) also includes a first port (169) for coupling the secure code verification device (104) to an integrity module in the trusted computing device (312) and a second port (171) for coupling the secure code verification device (104) to trusted memory in the trusted computing device (312). In the example of FIG. 2, each port may be configured to accept, for example, a connected to a USB cable, a connector to an I2C cable, a connector to an SPI cable, and so on.

Figure 3:
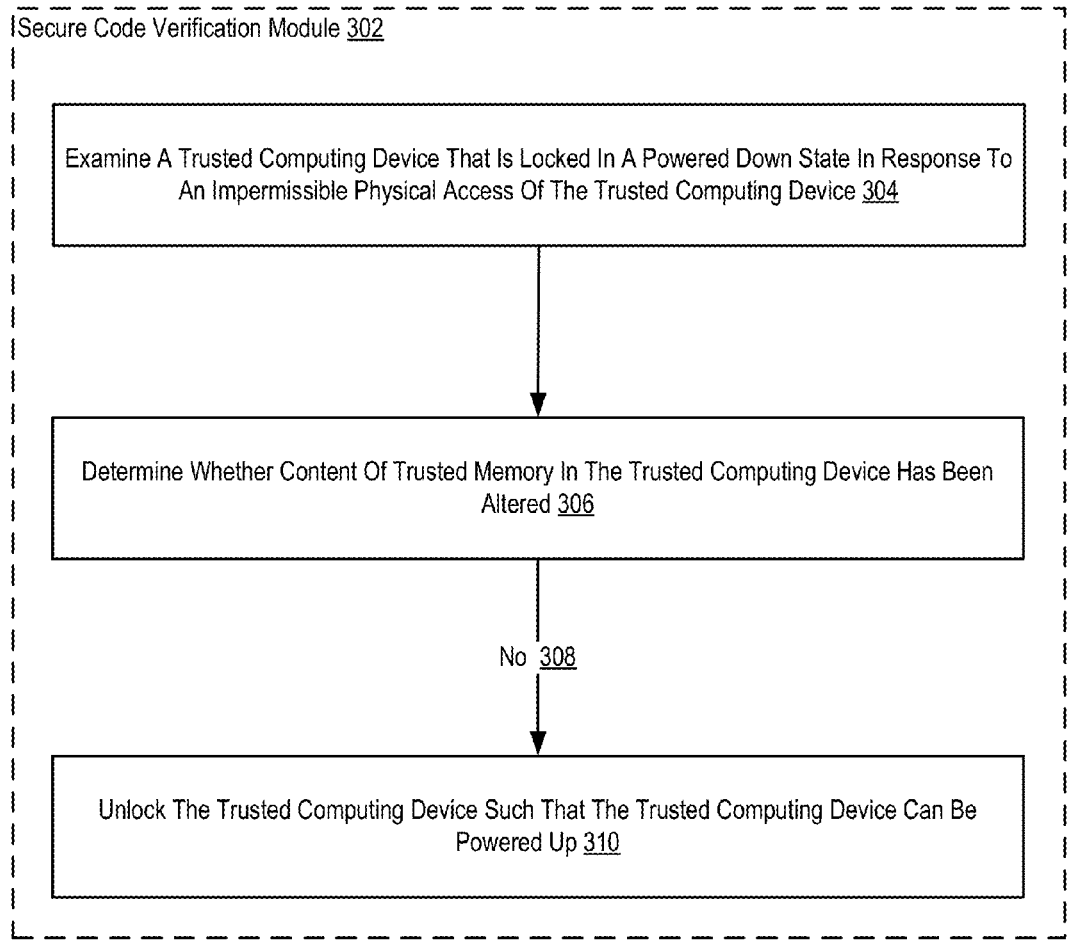
FIG. 3 sets forth a flow chart illustrating an example method for secure code verification enforcement in a trusted computing device according to embodiments of the present invention.
Figure 3:
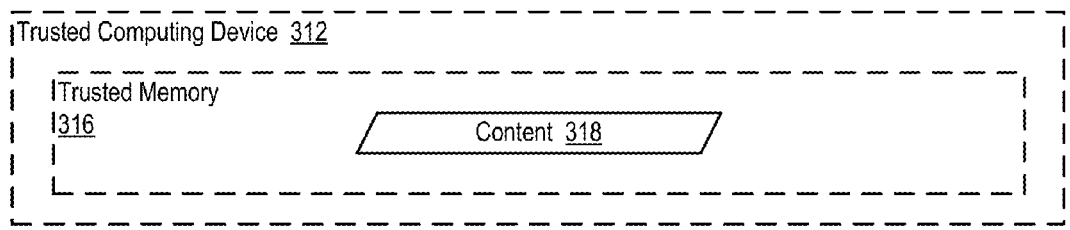

For further explanation, FIG. 3 sets forth a flow chart illustrating an example method for secure code verification enforcement in a trusted computing device (312) according to embodiments of the present invention. In the example method of FIG. 3, the trusted computing device (312) may be embodied, for example, as a standalone computer, server, blade server, and the like. The trusted computing device (312) includes secure code stored within computer memory within the computing device. Secure code can include, for example, computer program instructions stored in an option ROM.

The example method of FIG. 3 includes examining (304), by a secure code validation module (302), a trusted computing device (312) that is locked in a powered down state in response to an impermissible physical access of the trusted computing device (312). An impermissible physical access of the trusted computing device (312) may include, for example, opening an enclosure for the trusted computing device (312), taking the trusted computing device (312) outside of a secure area, and so on. The trusted computing device (312) may determine that it has been impermissibly accessed, for example, through the use of a sensor that identifies when the enclosure for the trusted computing device (312) has been opened, through the use of a near field communication ('NFC') device that can detect when it has been taken far enough away from another NFC device in a predetermined secure area such that the trusted computing device (312) is no longer in the secure area, and so on. In response to determining that the trusted computing device (312) has been impermissibly accessed, the trusted computing device (312) can be locked in a powered down state such that the trusted computing device (312) cannot be powered on.

In the example method of FIG. 3, a secure code validation module (302) examines (304) the trusted computing device (312) that is locked in a powered down state in response to an impermissible physical access of the trusted computing device (312). The secure code validation module (302) may be embodied, for example, as module of computer program instructions executed by computer hardware such as a computer processor. The secure code validation module (302) of FIG. 3 may reside, for example, in a standalone secure code validation device. In the example method of FIG. 3, the secure code validation module (302) examines (304) the trusted computing device (312), for example, by inspecting various aspects of the trusted computing device (312) to determine that secure code within the trusted computing device (312) has not been altered, disabled, or otherwise compromised during the impermissible physical access of the trusted computing device (312).

The example method of FIG. 3 also includes determining (306), by the secure code validation module (302), whether content (318) of trusted memory (316) in the trusted computing device (312) has been altered. In the example method of FIG. 3, the trusted memory (316) in the trusted computing device (312) may be embodied, for example, as an option ROM that includes system Basic Input Output System ('BIOS') for the trusted computing device (312), an option ROM that includes firmware for one or more peripheral devices installed on the trusted computing device (312), and so on. In the example method of FIG. 3, determining (306) whether content (318) of trusted memory (316) in the trusted computing device (312) has been altered may be carried out, for example, by doing a bit-by-bit comparison of the current content (318) of the trusted memory (316) to an archived version of the trusted memory (316) that is available to the secure code validation module (302), by comparing the total size of the current content (318) of the trusted memory (316) to the size of an archived version of the trusted memory (316) that is available to the secure code validation module (302), by applying the same hash function to the current content (318) of the trusted memory (316) and an archived version of the trusted memory (316) and comparing the resultant hash values, and so on.

The example method of FIG. 3 also includes unlocking (310), by the secure code validation module (302), the trusted computing device (312) such that the trusted computing device (312) can be powered up. In the example method of FIG. 3, unlocking (310) the trusted computing device (312) is carried out responsive to determining that the content (318) of trusted memory (316) in the trusted computing device (312) has not (308) been altered. Because the content (318) of trusted memory (316) in the trusted computing device (312) has not (308) been altered, the content (318) of trusted memory (316) in the trusted computing device (312) can be presumed to be uncompromised in spite of the fact that an impermissible physical access of the trusted computing device (312) occurred. As such, the trusted computing device (312) can be safely operated without concern that the trusted computing device (312) was compromised by the impermissible physical access of the trusted computing device (312). In the example method of FIG. 3, unlocking (310) the trusted computing device (312) such that the trusted computing device (312) can be powered up may be carried out, for example, by enabling a power sequencer that is responsible for powering up various components within the trusted computing device (312).

Figure 4:
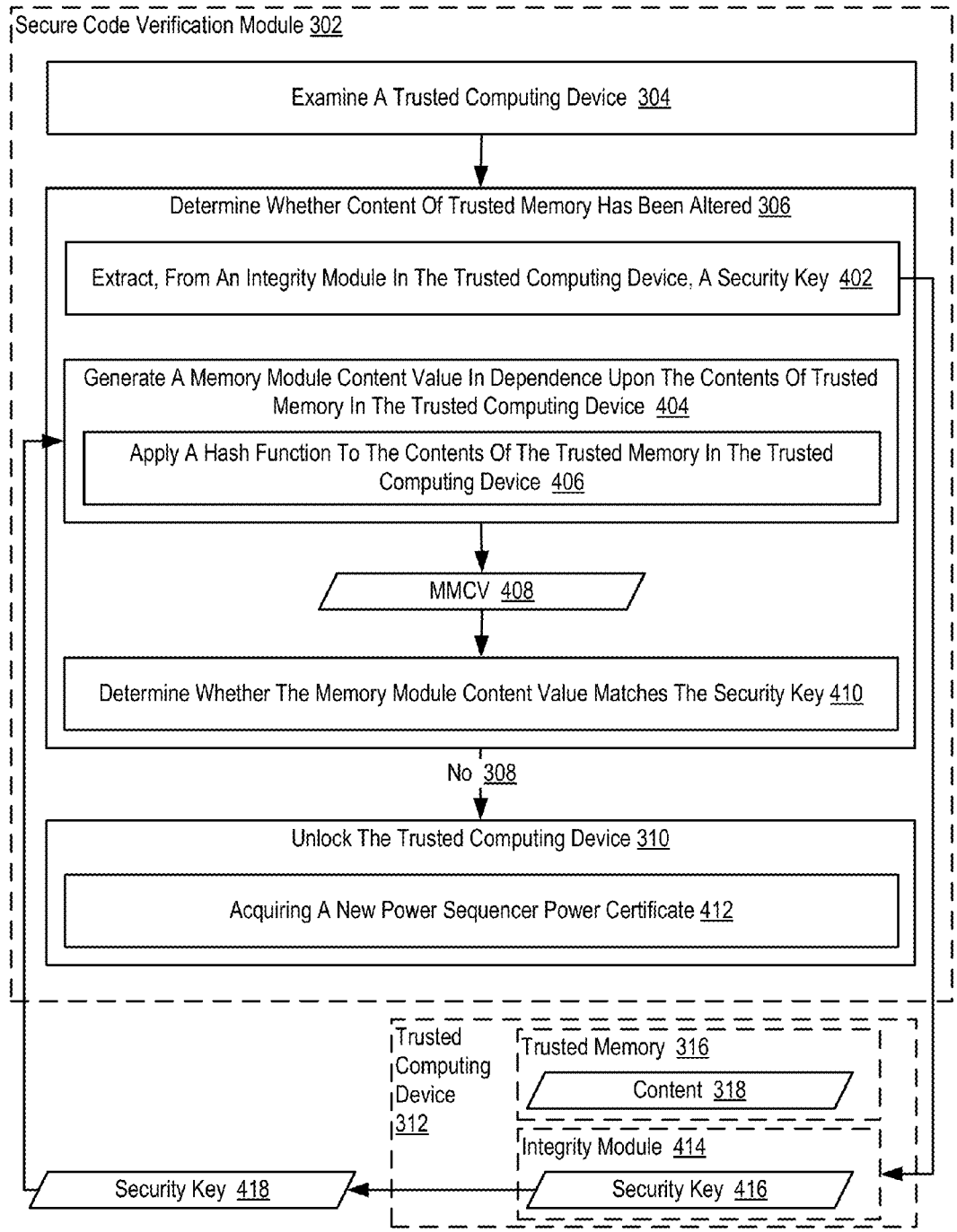
FIG. 4 sets forth a flow chart illustrating a further example method for secure code verification enforcement in a trusted computing device according to embodiments of the present invention.

For further explanation, FIG. 4 sets forth a flow chart illustrating a further example method for secure code verification enforcement in a trusted computing device (312) according to embodiments of the present invention. The example method of FIG. 4 is similar to the example method of FIG. 3 as it also includes examining (304) a trusted computing device (312) that is locked in a powered down state, determining (306) whether content (318) of trusted memory (316) in the trusted computing device (312) has been altered, and unlocking (310) the trusted computing device (312) such that the trusted computing device (312) can be powered up.

In the example method of FIG. 4, determining (306) whether content (318) of trusted memory (316) in the trusted computing device (312) has been altered includes extracting (402), by the secure code validation module (302) from an integrity module (414) in the trusted computing device (312), a security key (418). The integrity module (414) in the trusted computing device (312) may be embodied, for example, as an ASIC, CPLD, or similar computer logic component that includes computer memory for storing the security key (418). The security key (418) represents a particular value that may be used to verify the validity of the content (318) of trusted memory (316) in the trusted computing device (312). For example, the security key (418) may be set to the resultant value of performing a particular hash operation on the original content of trusted memory (316) in the trusted computing device (312).

In the example method of FIG. 4, the secure code validation module (302) may extract (402) the security key (418) from the integrity module (414) in the trusted computing device (312) over an I2C encrypted communications cable coupling the integrity module (414) in the trusted computing device (312) to the secure code validation module (302). I2C is a multi-master serial computer bus invented by primarily used to attach low-speed peripherals to a motherboard, embedded system, cellphone, or other electronic device. In the example method of FIG. 4, the I2C encrypted communications cable includes data communications lines for implementing the I2C bus architecture. In such an example, one end of the I2C encrypted communications cable may be coupled to a port on the trusted computing device (312) that is operatively coupled to the integrity module (414) and the other end of the I2C encrypted communications cable may be coupled to a port on a secure code verification device that is operatively coupled to the secure code verification module (312).

In the example method of FIG. 4, determining (306) whether content (318) of trusted memory (316) in the trusted computing device (312) has been altered also includes generating (404), by the secure code validation module (302), a memory module content value (408) in dependence upon the contents (318) of trusted memory (316) in the trusted computing device (312). In the example method of FIG. 4, the memory module content value (408) is a value that represents the content (318) of trusted memory (316) in the trusted computing device (312). In the example method of FIG. 4, generating (404) a memory module content value (408) in dependence upon the contents (318) of trusted memory (316) in the trusted computing device (312) may be carried out, for example, by applying (406) a hash function to the contents (318) of the trusted memory (316) in the trusted computing device (312). Such a hash function may take the contents (318) of the trusted memory (316) in the trusted computing device (312) as input and generate a value output. Such a value can serve as a unique identifier of the contents (318) of the trusted memory (316) in the trusted computing device (312) as applying the same hash value to different input would result in a different output value.

In the example method of FIG. 4, determining (306) whether content (318) of trusted memory (316) in the trusted computing device (312) has been altered also includes determining (410), by the secure code verification module (302), whether the memory module content value (408) matches the security key (416). In the example method of FIG. 4, applying the same hash function to the original content of the trusted memory (316) and the current content (318) of the trusted memory (316), and comparing the resultant values, can enable the secure code verification module (302) to verify that the contents of the trusted memory (316) have not been altered, in spite of the impermissible physical access of the trusted computing device (312).

In the example method of FIG. 4, unlocking (310) the trusted computing device (312) such that the trusted computing device (312) can be powered up can include acquiring (412) a new power sequencer power certificate. In the example method of FIG. 4, a power sequencer that participates in the process of powering up various components within the trusted computing device (312) cannot operate without a valid power sequencer power certificate. In order to enable the power sequencer, a new power sequencer power certificate may therefore be acquired (412) enable the power sequencer to function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of secure code verification enforcement in a trusted computing device, the method comprising:
  examining, by a secure code validation module, a trusted computing device that is locked in a powered down state in response to detection of an impermissible physical access of the trusted computing device;

determining, by the secure code validation module, whether content of trusted memory in the trusted computing device has been altered, wherein determining whether the content of trusted memory in the trusted computing device has been altered further comprises extracting over an Inter-Integrated circuit encrypted communication cable coupling an integrity module in the trusted computing device to the secure code validation module, by the secure code validation module from the integrity module, a security key; and responsive to determining that the content of trusted memory in the trusted computing device has not been altered, unlocking, by the secure code validation module, the trusted computing device such that the trusted computing device can be powered up.

2. The method of claim 1 wherein determining whether the content of trusted memory in the trusted computing device has been altered further comprises:

generating, by the secure code validation module, a memory module content value in dependence upon the contents of trusted memory in the trusted computing device; and determining, by the secure code verification module, whether the memory module content value matches the security key.

3. The method of claim 2 wherein generating a memory module content value in dependence upon the contents of trusted memory in the trusted computing device includes applying a hash function to the contents of the trusted memory in the trusted computing device.

4. The method of claim 1 wherein unlocking the trusted computing device such that the trusted computing device can be powered up includes acquiring a new power sequencer power certificate.

5. The method of claim 1 wherein the trusted computing device has been identified as being impermissibly physically accessed through the use of an indicator light.

6. A secure code verification device, the secure code verification device including computer memory operatively coupled to a computer processor, the computer memory including computer program instructions that, when executed by the computer processor, cause the secure code verification device to carry out the steps of:

examining a trusted computing device that is locked in a powered down state in response to an impermissible physical access of the trusted computing device;

determining whether content of trusted memory in the trusted computing device has been altered, wherein determining whether the content of trusted memory in the trusted computing device has been altered further comprises extracting over an Inter-Integrated circuit encrypted communication cable coupling an integrity module in the trusted computing device to the secure code verification device, by the secure code verification device, a security key from the integrity module; and responsive to determining that the content of trusted memory in the trusted computing device has not been altered, unlocking the trusted computing device such that the trusted computing device can be powered up.

7. The secure code verification device of claim 6 wherein determining whether the content of trusted memory in the trusted computing device has been altered further comprises:

generating a memory module content value in dependence upon the contents of trusted memory in the trusted computing device; and determining, by the secure code verification device, whether the memory module content value matches the security key.

8. The secure code verification device of claim 7 wherein generating a memory module content value in dependence upon the contents of trusted memory in the trusted computing device includes applying a hash function to the contents of the trusted memory in the trusted computing device.

9. The secure code verification device of claim 6 wherein unlocking the trusted computing device such that the trusted computing device can be powered up includes acquiring a new power sequencer power certificate.

10. The secure code verification device of claim 6 further comprising:

a first port for coupling the secure code verification device to an integrity module in the trusted computing device; and a second port for coupling the secure code verification device to trusted memory in the trusted computing device.

11. A trusted computing device, the trusted computing device including:

one or more intrusion detection modules configured to detect an impermissible physical access of the trusted computing device;

trusted memory that includes secure code; and an integrity module operatively coupled to the one or more intrusion detection modules, wherein the integrity module includes computer memory that contains a security key, the integrity module configured to:

lock, upon receiving an indication of an impermissible physical access of the trusted computing device from the one or more intrusion detection modules, the trusted computing device such that the trusted computing device cannot be powered up;

transmit the security key over an Inter-Integrated circuit encrypted communications cable coupling the integrity module to a secure code validation module in a standalone secure code verification device; and unlock, upon receiving an indication of secure code validity from the secure code verification device, the trusted computing device such that the trusted computing device can be powered up.

12. The trusted computing device of claim 11 wherein locking the trusted computing device such that the trusted computing device cannot be powered up includes invalidating a power sequencer power certificate.

13. The trusted computing device of claim 11 wherein unlocking the trusted computing device such that the trusted computing device can be powered up includes acquiring a new power sequencer power certificate.

14. The trusted computing device of claim 11 further comprising an indicator light operatively coupled to the one or more intrusion detection modules, wherein the indicator light illuminates upon receiving an indication of an impermissible physical access of the trusted computing device from the one or more intrusion detection modules.

15. The trusted computing device of claim 11 wherein the trusted memory is an option ROM.

16. The trusted computing device of claim 11 wherein the secure code includes firmware.

* * * * *